(12) United States Patent
Aimura

(10) Patent No.: US 9,165,197 B2
(45) Date of Patent: Oct. 20, 2015

(54) VEHICLE SURROUNDINGS MONITORING APPARATUS

(71) Applicant: HONDA MOTOR CO., LTD, Tokyo (JP)

(72) Inventor: Makoto Aimura, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 388 days.

(21) Appl. No.: 13/758,503

(22) Filed: Feb. 4, 2013

(65) Prior Publication Data

US 2013/0229520 A1 Sep. 5, 2013

(30) Foreign Application Priority Data

Mar. 5, 2012 (JP) ................................. 2012-048639

(51) Int. Cl.
  *G06K 9/00* (2006.01)
(52) U.S. Cl.
  CPC ........ *G06K 9/00805* (2013.01); *G06K 9/00825* (2013.01)
(58) Field of Classification Search
  CPC ....................... G06K 9/00805; G06K 9/00825
  See application file for complete search history.

(56) References Cited

U.S. PATENT DOCUMENTS

| | | | |
|---|---|---|---|
| 6,327,536 B1 | 12/2001 | Tsuji et al. | |
| 7,130,448 B2 | 10/2006 | Nagaoka et al. | |
| 7,586,400 B2 | 9/2009 | Nagaoka et al. | |
| 2009/0058678 A1* | 3/2009 | Matsuoka et al. | 340/904 |
| 2009/0174573 A1* | 7/2009 | Smith | 340/905 |
| 2009/0303077 A1* | 12/2009 | Onome et al. | 340/901 |
| 2010/0033571 A1* | 2/2010 | Fujita et al. | 348/149 |
| 2010/0100268 A1* | 4/2010 | Zhang et al. | 701/25 |
| 2010/0102990 A1* | 4/2010 | Kamioka | 340/942 |
| 2011/0135155 A1* | 6/2011 | Kudo | 382/104 |
| 2011/0182475 A1* | 7/2011 | Fairfield et al. | 382/104 |
| 2012/0249795 A1* | 10/2012 | Ito | 348/148 |
| 2012/0262579 A1* | 10/2012 | Chen et al. | 348/148 |
| 2012/0288149 A1* | 11/2012 | Kido | 382/103 |
| 2012/0288150 A1* | 11/2012 | Kido | 382/103 |
| 2012/0327188 A1* | 12/2012 | Takemura et al. | 348/46 |
| 2013/0129150 A1* | 5/2013 | Saito | 382/104 |
| 2013/0177212 A1* | 7/2013 | Wright et al. | 382/104 |
| 2013/0182111 A1* | 7/2013 | Ogasawara | 348/148 |

(Continued)

FOREIGN PATENT DOCUMENTS

| | | | |
|---|---|---|---|
| JP | 2001-006096 A | 1/2001 |
| JP | 2003-284057 A | 10/2003 |
| JP | 2007-213561 A | 8/2007 |

*Primary Examiner* — Brian Yenke
(74) *Attorney, Agent, or Firm* — Westerman, Hattori, Daniels & Adrian, LLP

(57) ABSTRACT

In an image captured by an infrared camera mounted in a vehicle, a featured image portion group including first and second high luminance image portions lined up side by side vertically or horizontally and a third high luminance image portion located below the first and second high luminance image portions is defined. The featured image portion group has a feature indicating that a similarity of one of a luminance distribution and a shape between the first high luminance image portion and the second high luminance image portion is higher than between the third high luminance image portion and at least one of the first and second high luminance image portions. If the featured image portion group is found in the captured image, it is determined that at least the third high luminance image portion is the image of a component of a traffic signal structure.

12 Claims, 9 Drawing Sheets

(56) References Cited

U.S. PATENT DOCUMENTS

| | | |
|---|---|---|
| 2013/0229525 A1* | 9/2013 | Nagaoka et al. .............. 348/148 |
| 2014/0063248 A1* | 3/2014 | Sakagami et al. ............ 348/148 |
| 2014/0133698 A1* | 5/2014 | Fernandez et al. ............ 382/103 |
| 2014/0204209 A1* | 7/2014 | Huth et al. .................... 348/148 |
| 2015/0029012 A1* | 1/2015 | Mitani et al. .................. 340/436 |

\* cited by examiner

# VEHICLE SURROUNDINGS MONITORING APPARATUS

CROSS REFERENCES TO RELATED APPLICATIONS

The present application claims priority under 35 U.S.C. §119 to Japanese Patent Application No. 2012-048639, filed Mar. 5, 2012, entitled "Vehicle Surroundings Monitoring Apparatus." The contents of this application are incorporated herein by reference in their entirety.

TECHNICAL FIELD

The present disclosure relates to a vehicle surroundings monitoring apparatus that monitors the vicinity of a vehicle using an infrared camera mounted in the vehicle.

BACKGROUND

Some existing vehicle surroundings monitoring apparatuses detect, from an image captured by an infrared camera mounted in a vehicle, the image of an attention needed object that should be the main object of a driver's attention (e.g., a human being (a pedestrian)) other than an artificial structure. Thereafter, if an attention needed object is detected, the vehicle surroundings monitoring apparatuses perform an alerting process (e.g., sounding an alarm) for a driver as needed (refer to, for example, Japanese Unexamined Patent Application Publication No. 2003-284057).

SUMMARY

The inventor found the followings. In the United States, when a vehicle travels in the vicinity of an intersection, for example, the image of a traffic signal structure 100 as illustrated in FIG. 6 is frequently captured by an infrared camera mounted in the vehicle. The traffic signal structure 100 includes a pedestrian traffic light 102 having a rectangular traffic light emitting unit 101, a vehicle traffic light 104 having a plurality of circular traffic light emitting units 103 lined up side by side vertically, and a pole 105. The pedestrian traffic light 102 and the vehicle traffic light 104 are attached to the pole 105 so that the pedestrian traffic light 102 is disposed under the vehicle traffic light 104.

In contrast, in Japan, when a vehicle travels in the vicinity of a railroad crossing, for example, the image of a traffic signal structure 110 as illustrated in FIG. 9 is frequently captured by an infrared camera mounted in the vehicle. The traffic signal structure 110 includes a plurality of circular traffic light emitting units 111 lined up side by side horizontally (alternately and intermittently flashed, and hereinafter also referred to as "intermittent light emitting units 111"), a traffic light emitting unit 112 that continuously emits light indicating a direction in which a train travels in the railway crossing (hereinafter also referred to as a "travel direction indicator light emitting unit 112"), and a pole 113. The circular traffic light emitting units 111 and the traffic light emitting unit 112 are attached to the pole 113 so that the travel direction indicator light emitting unit 112 is disposed below the intermittent light emitting units 111.

Since the traffic signal structures 100 and 110 are stationary artificial structures, the traffic signal structures 100 and 110 are to be excluded from a group of attention needed objects, in general.

However, in existing vehicle surroundings monitoring apparatuses as described in, for example, Japanese Unexamined Patent Application Publication No. 2003-284057, a technique for distinguishing each of the images of the traffic signal structures 100 and 110 from the image of an attention needed object and recognizing an attention needed object may have room for improvement. That is, when reviewing the technique, the present inventor has discovered that in some cases, a partial image of each of the traffic signal structures 100 and 110 may be recognized as the image of a human being (a pedestrian).

For example, if, in the United States, the image of the traffic signal structure 100 as illustrated in FIG. 6 is found in an image captured by the infrared camera, the image of the traffic light emitting unit 101 of the pedestrian traffic light 102 may be recognized as the image of the head of a human being. In addition, the image of the lower part of the pole 105 under the pedestrian traffic light 102 may be recognized as the image of the body of the human being.

Furthermore, if, in Japan, the image of the traffic signal structure 110 as illustrated in FIG. 9 is found in an image captured by the infrared camera, the image of the travel direction indicator light emitting unit 112 of the traffic signal structure 110 may be recognized as the image of the head of a human being. In addition, the image of the lower part of the pole 113 under the travel direction indicator light emitting unit 112 may be recognized as the image of the body of the human being.

Accordingly, the present application provides a vehicle surroundings monitoring apparatus capable of properly recognizing the image of a traffic signal structure in an image captured by an infrared camera mounted in the vehicle.

According to the present disclosure, a vehicle surroundings monitoring apparatus for performing an object recognition process on an object located in the vicinity of a vehicle on the basis of an image captured by an infrared camera mounted in a vehicle is provided. The vehicle surroundings monitoring apparatus includes a structure recognition unit that detects whether a featured image portion group is included in the captured image. The featured image portion group includes first and second high luminance image portions lined up side by side vertically or horizontally and a third high luminance image portion located below the first and second high luminance image portions. The featured image portion group has a feature indicating that a similarity of one of a luminance distribution and a shape between the first high luminance image portion and the second high luminance image portion is higher than a similarity of that one of the luminance distribution and the shape between the third high luminance image portion and at least one of the first and second high luminance image portions. Upon detecting the featured image portion group in the captured image, the structure recognition unit determines that at least the third high luminance image portion is an image of a component of a traffic signal structure (a first aspect of the present disclosure).

If, for example, the traffic signal structure 100 installed in the United States is present in the imaging area of the infrared camera, the image of the traffic light emitting unit 101 of the pedestrian traffic light 102 or the traffic light emitting units 103 of the vehicle traffic light 104 generally appears in the image captured by the infrared camera in the form of an image portion with relatively high luminance (relatively high temperature).

In such a case, the traffic light emitting units 103 of the vehicle traffic light 104 are lined up side by side vertically, and the image portion of the traffic light emitting unit 101 of the pedestrian traffic light 102 is located under the traffic light emitting units 103. In addition, in general, the luminance distributions and the shapes (including the sizes) of the image portions of the traffic light emitting units 103 of the vehicle traffic light 104 are similar to each other. In contrast, the luminance distribution and the shape of the image of each of the image portions of the traffic light emitting units 103 of the vehicle traffic light 104 differ from those of the image portion of the traffic light emitting unit 101 of the pedestrian traffic light 102.

Furthermore, if, for example, the traffic signal structure 110 installed in Japan is present in the imaging area of the infrared camera, the images of the intermittent light emitting units 111 and the travel direction indicator light emitting unit 112 generally appear in the image captured by the infrared camera in the form of image portions with relatively high luminance (relatively high temperature).

In such a case, the image portions of the intermittent light emitting units 111 are lined up side by side horizontally, and the image portion of the travel direction indicator light emitting unit 112 is located below the image portions of the intermittent light emitting units 111. In addition, in general, the luminance distributions and the shapes (including the sizes) of the intermittent light emitting units 111 are similar to each other. In contrast, the luminance distribution and the shape of the image of each of the intermittent light emitting units 111 differ from those of the image portion of the travel direction indicator light emitting unit 112.

Using such features of the image portions of the traffic signal structure 100 or the traffic signal structure 110, in the first aspect of the present disclosure, the structure recognition unit detects whether a featured image portion group is included in the captured image. The featured image portion group includes first and second high luminance image portions lined up side by side vertically or horizontally and a third high luminance image portion located below the first and second high luminance image portions, and the featured image portion group has a feature indicating that a similarity of one of a luminance distribution and a shape between the first high luminance image portion and the second high luminance image portion is higher than between the third high luminance image portion and at least one of the first and second high luminance image portions. Upon detecting the featured image portion group in the captured image, the structure recognition unit determines that at least the third high luminance image portion is an image of a component of a traffic signal structure.

Note that in addition to the third high luminance image portion, it may be determined that each of the first and second high luminance image portions is also the image of one of the components of the traffic signal structure.

In this manner, according to the first aspect of the present disclosure, if the image of a traffic signal structure, such as the traffic signal structure 100 or 110, is included in an image captured by the infrared camera, the image of the traffic signal structure can be distinguished from the image of another object, such as a human being, and, therefore, can be correctly recognized (not falsely recognized as another object).

In the first aspect of the present disclosure, when the featured image portion group includes the first and second high luminance image portions lined up side by side vertically and the third high luminance image portion located below the first and second high luminance image portions and if the featured image portion group is detected in the captured image, the structure recognition unit determines that at least the third high luminance image portion is an image of a component of a traffic signal structure installed on a road in the United States (a second aspect of the present disclosure).

According to the second aspect of the present disclosure, when the featured image portion group is detected, the third high luminance image portion corresponds to the traffic light emitting unit 101 of the pedestrian traffic light 102 of the traffic signal structure 100 installed in the United states. In addition, each of the first and second high luminance image portions corresponds to one of the traffic light emitting units 103 of the vehicle traffic light 104 of the traffic signal structure 100. Accordingly, if the featured image portion group is detected, it can be determined that at least the third high luminance image portion is the image of one of the components of the traffic signal structure installed in a road in the United States.

Furthermore, in the first aspect of the present disclosure, when the featured image portion group includes the first and second high luminance image portions lined up side by side horizontally and the third high luminance image portion located below the first and second high luminance image portions and if the featured image portion group is detected in the captured image, the structure recognition unit determines that at least the third high luminance image portion is an image of a component of a traffic signal structure installed in a railway crossing in Japan (a third aspect of the present disclosure).

According to the third aspect of the present disclosure, when the featured image portion group is detected, the third high luminance image portion corresponds to the travel direction indicator light emitting unit 112 of the traffic signal structure 110 installed in Japan. In addition, each of the first and second high luminance image portions corresponds to one of the intermittent light emitting units 111 of the traffic signal structure 110. Accordingly, if the featured image portion group is detected, it can be determined that at least the third high luminance image portion is the image of one of the components of the traffic signal structure installed in a railway crossing in Japan.

Note that in general, the traffic signal structure 100 in the United States is installed at an intersection, and the traffic signal structure 110 in Japan is installed in a railway crossing.

Accordingly, in the second aspect of the present disclosure, on condition that the vehicle is located in the vicinity of an intersection, it is desirable that the structure recognition unit detect whether the featured image portion group is included in the captured image (a fourth aspect of the present disclosure).

In addition, in the third aspect of the present disclosure, on condition that the vehicle is located in the vicinity of a railway crossing, it is desirable that the structure recognition unit detect whether the featured image portion group is included in the captured image (a fifth aspect of the present disclosure).

According to the fourth or fifth aspect of the present disclosure, if the traffic signal structure 100 or 110 is not present, a process for detecting whether the featured image portion group is included in the captured image can be skipped. In this manner, the processing load imposed on the vehicle surroundings monitoring apparatus can be reduced.

Furthermore, as a more particular form of the above-described first to fifth aspects of the present disclosure, the vehicle surroundings monitoring apparatus further includes an attention needed object detecting unit that detects, from the captured image, an image of an attention needed object of predetermined types including at least a human being and an alerting unit that performs a process for alerting a driver of the vehicle to the attention needed object when the image of the attention needed object is detected. If the structure recognition unit determines that the third high luminance image portion is the image of one of the components of the traffic signal structure, the attention needed object detecting unit determines that at least the third high luminance image portion is not the image of the attention needed object (a sixth aspect of the present disclosure).

In such a case, if the images of the traffic light emitting unit 101 of the pedestrian traffic light 102 of the traffic signal structure 100 and the traffic light emitting units 103 of the vehicle traffic light 104 installed in the United States are included in the image captured by the infrared camera, it is likely that the image of the traffic light emitting unit 101 of the pedestrian traffic light 102, which is located at a position relatively lower than that of the traffic light emitting units 103, may be recognized as the head of a human being which is an attention needed object.

In addition, if the images of the travel direction indicator light emitting unit 112 and the intermittent light emitting units 111 of the traffic signal structure 110 installed in Japan are included in the image captured by the infrared camera, it is likely that the image of the travel direction indicator light emitting unit 112, which is located at a position relatively lower than that of the intermittent light emitting units 111, may be recognized as the head of a human being which is an attention needed object.

However, according to the sixth aspect of the present disclosure, if the structure recognition unit determines that the third high luminance image portion is the image of one of the components of the traffic signal structure, the attention needed object detecting unit determines that at least the third high luminance image portion is not the image of an attention needed object.

Accordingly, more accurate recognition in which the image of one of the components of the traffic signal structure is effectively distinguished among the image of the attention needed object can be achieved. Thus, the performance of the attention needed process in which the driver is alerted to the traffic signal structure can be prevented. That is, an unnecessary alert to the driver can be prevented.

In the sixth aspect of the present disclosure, if the structure recognition unit determines that the third high luminance image portion is the image of one of the components of the traffic signal structure, the attention needed object detecting unit may continue to determine that at least the third high luminance image portion is not the image of the attention needed object for at least a predetermined period of time (a seventh aspect of the present disclosure).

That is, during a period of time during which the traffic signal structure is continuously present in the imaging area of the infrared camera, a situation may occur in which the featured image portion group cannot be temporarily detected due to, for example, an external disturbance on the image captured by the infrared camera.

According to the seventh aspect of the present disclosure, in such a situation, a change in the result of determination as to whether the third high luminance image portion (or the first to third high luminance image portions) is the image of the components of the traffic signal structure can be prevented.

In addition, in the sixth or seventh aspect of the present disclosure, if the structure recognition unit determines that the third high luminance image portion is the image of one of the components of the traffic signal structure, the attention needed object detecting unit may determine that an image of an object located above the third high luminance image portion in the captured image is not the image of the attention needed object (an eighth aspect of the present disclosure).

Note that in general, the traffic light emitting unit 101 of the pedestrian traffic light 102 of the traffic signal structure 100 installed in the United States and the travel direction indicator light emitting unit 112 of the traffic signal structure 110 installed in Japan are located at a position higher than the head of a human being. Therefore, it is highly likely that the image of an object located above the third high luminance image portion in the captured image is not the image of an attention needed object.

Therefore, according to the eighth aspect of the present disclosure, it is determined that the image of an object located above the third high luminance image portion that is recognized as the image of one of the components of the traffic signal structure in the captured image is not the image of an attention needed object. In this manner, it can be determined that the image of an object located above the third high luminance image portion is not the image of an attention needed object without performing the process for detecting the featured image portion group. As a result, the processing load imposed on the vehicle surroundings monitoring apparatus can be reduced. In the above descriptions, exemplary embodiments of the traffic signal structures 100 and 110 are used for solely facilitating understandings. Therefore, the accompanying claims should not be interpreted to be limited to those exemplary embodiments.

BRIEF DESCRIPTION OF THE DRAWINGS

The advantages of the disclosure will become apparent in the following description taken in conjunction with the following drawings.

DETAILED DESCRIPTION

First Exemplary Embodiment

A first exemplary embodiment of the present disclosure is described below with reference to FIGS. 1 to 6. Note that the present exemplary embodiment relates to a vehicle traveling in the United States.

Figure 1:
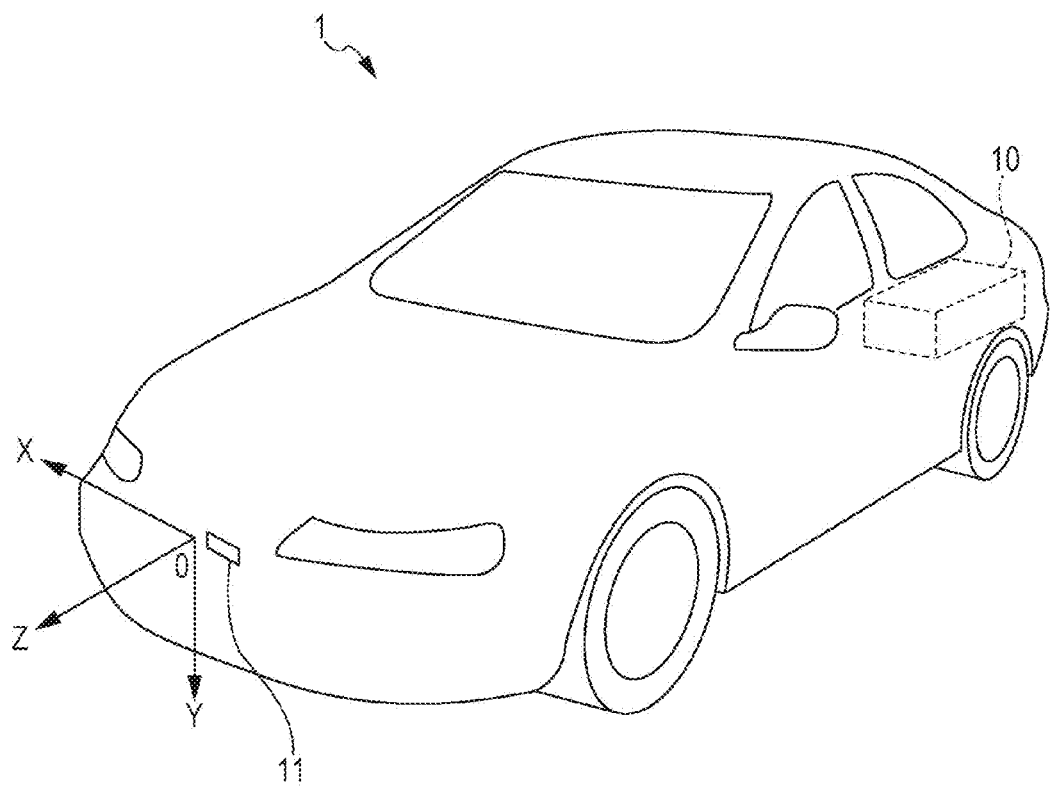
FIG. 1 is a perspective view of a vehicle according to exemplary embodiments (first and second exemplary embodiments) of the disclosure.

As illustrated in FIG. 1, a vehicle 1 has a vehicle surroundings monitoring apparatus 10 and an infrared camera 11 mounted therein. The infrared camera 11 can detect a far infrared light ray. The infrared camera 11 is mounted in the front section of the vehicle 1 in order to capture an image in front of the vehicle 1. In the present application, the "infrared camera" means a camera capable of capturing an infrared image and outputting an infrared image signal. Thus, the camera 11 is not limited to any specific type. A solid state imaging device including a lens and a semiconductor image sensor such as CMOS or CCD image sensor may be included in the infrared camera.

Note that according to the present exemplary embodiment, the single infrared camera 11 is mounted in the vehicle 1. However, two or more infrared cameras that form a stereo camera may be mounted in the vehicle 1.

In addition, in order to detect the behavior of the vehicle 1, a variety of sensors are mounted in the vehicle 1. For example, as illustrated in FIG. 2, the vehicle 1 includes a yaw rate sensor 12 that outputs a signal in accordance with the yaw rate of the vehicle 1, a vehicle speed sensor 13 that outputs a signal in accordance with the speed (the vehicle speed) of the vehicle 1, and a brake sensor 14 that outputs a signal in accordance with the pedal position of a brake pedal (a brake pedal depression amount) of the vehicle 1.

Figure 2:
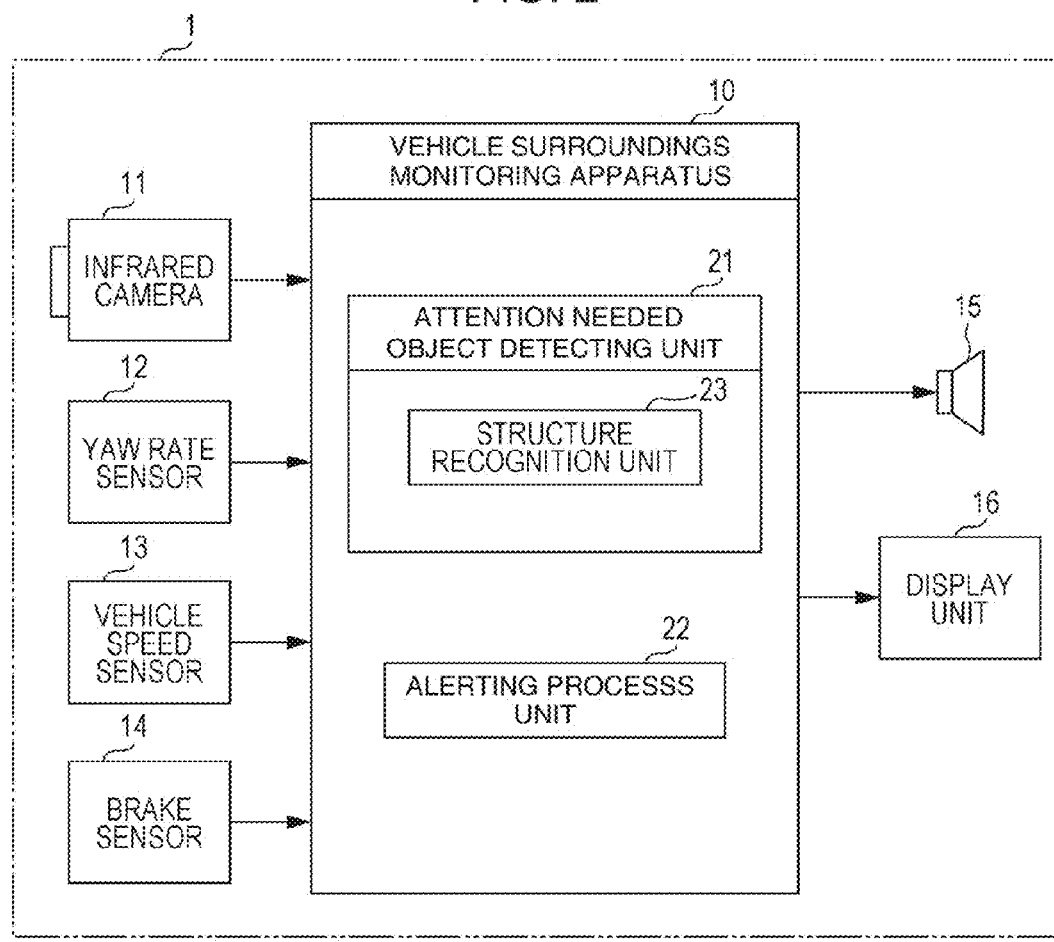
FIG. 2 is a block diagram of an exemplary system configuration of a vehicle surroundings monitoring apparatus mounted in the vehicle illustrated in FIG. 1.

Furthermore, as illustrated in FIG. 2, the vehicle 1 includes a speaker 15 that outputs, for example, speech information and alarm sound to a driver and a display unit 16 that outputs image information, such as an image captured by the infrared camera 11, to the driver.

The display unit 16 includes, for example, a headup display that displays image information on a windshield of the vehicle 1 or a liquid crystal display mounted on the dashboard of the vehicle compartment. Note that the display unit 16 may also function as a display of an audio system.

To assist the driver to drive the vehicle 1, the vehicle surroundings monitoring apparatus 10 monitors the surroundings of the vehicle 1. The vehicle surroundings monitoring apparatus 10 includes an electronic circuit unit having a central processing unit (CPU), a random access memory (RAM), a read only memory (ROM), and an interface circuit therein.

The vehicle surroundings monitoring apparatus 10 receives an image signal of the image captured by the infrared camera 11 and detection signals output from the above-described sensors 12, 13, and 14. The image signal may be a video signal. In addition, the vehicle surroundings monitoring apparatus 10 is connected to the speaker 15 and the display unit 16 so as to control the sound output operation performed by the speaker 15 and an image displayed on the display unit 16.

The vehicle surroundings monitoring apparatus 10 includes an attention needed object detecting unit 21 that detects a particular object in front of the vehicle 1 (in an imaging area of the infrared camera 11) as an attention needed object to which the driver should pay attention and an alerting process unit 22 that performs a process for attracting the attention of the driver (hereinafter referred to as an "alerting process") for the attention needed object if the attention needed object is detected. Note that the attention needed object detecting unit 21 and the alerting process unit 22 are realized by a computer program installed in the vehicle surroundings monitoring apparatus 10 (and a processor executing such a computer program).

Figure 6:
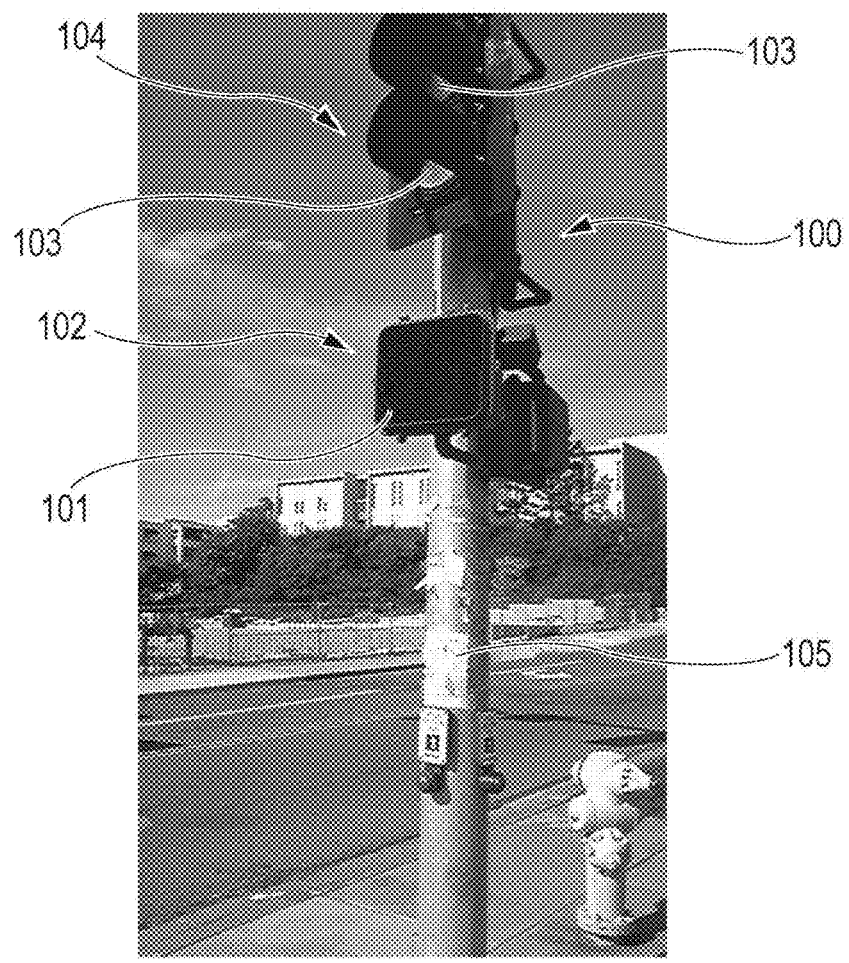
FIG. 6 illustrates an example of a traffic signal structure related to the processing illustrated by the flowchart in FIG. 4.

According to the present exemplary embodiment, the attention needed object detected by the attention needed object detecting unit 21 is a human being (a pedestrian) which is an object of a particular type having a possibility of colliding with the vehicle 1 in the near future. In this case, an artificial structure, such as the traffic signal structure 100 illustrated in FIG. 6, is not included in the group of the attention needed objects. The attention object detecting unit 21 also has a function so as to serve as a structure recognition unit 23 that determines whether an object found in the image captured by the infrared camera 11 is an artificial structure, such as the traffic signal structure 100. Note that in addition to a human being, the group of the attention needed objects may include an animal (a four-footed animal).

In addition, the alerting process performed by the alerting process unit 22 includes, for example, a sub-process for outputting, from the speaker 15, speech sound or alarm sound for alerting the driver to an attention needed object. The alerting process further includes a sub-process for displaying, on the display unit 16, the image captured by the infrared camera 11 (a grayscale image) and emphatically displaying the image of the attention needed object in the image captured by the infrared camera 11 (e.g., displaying a frame that surrounds the image of the attention needed object and causing the frame to blink).

Note that the vehicle surroundings monitoring apparatus 10 need not be formed from a single unit. For example, the vehicle surroundings monitoring apparatus 10 may be formed from distributed electronic circuit units each including a CPU or a processor.

That is, the attention needed object detecting unit 21, the alerting process unit 22, and the structure recognition unit 23 of the vehicle surroundings monitoring apparatus 10 serve as an attention needed object detecting unit, an alerting unit, and a structure recognition unit of the present disclosure, respectively.

The vehicle surroundings monitoring apparatus 10 is described in more detail next.

Figure 3:
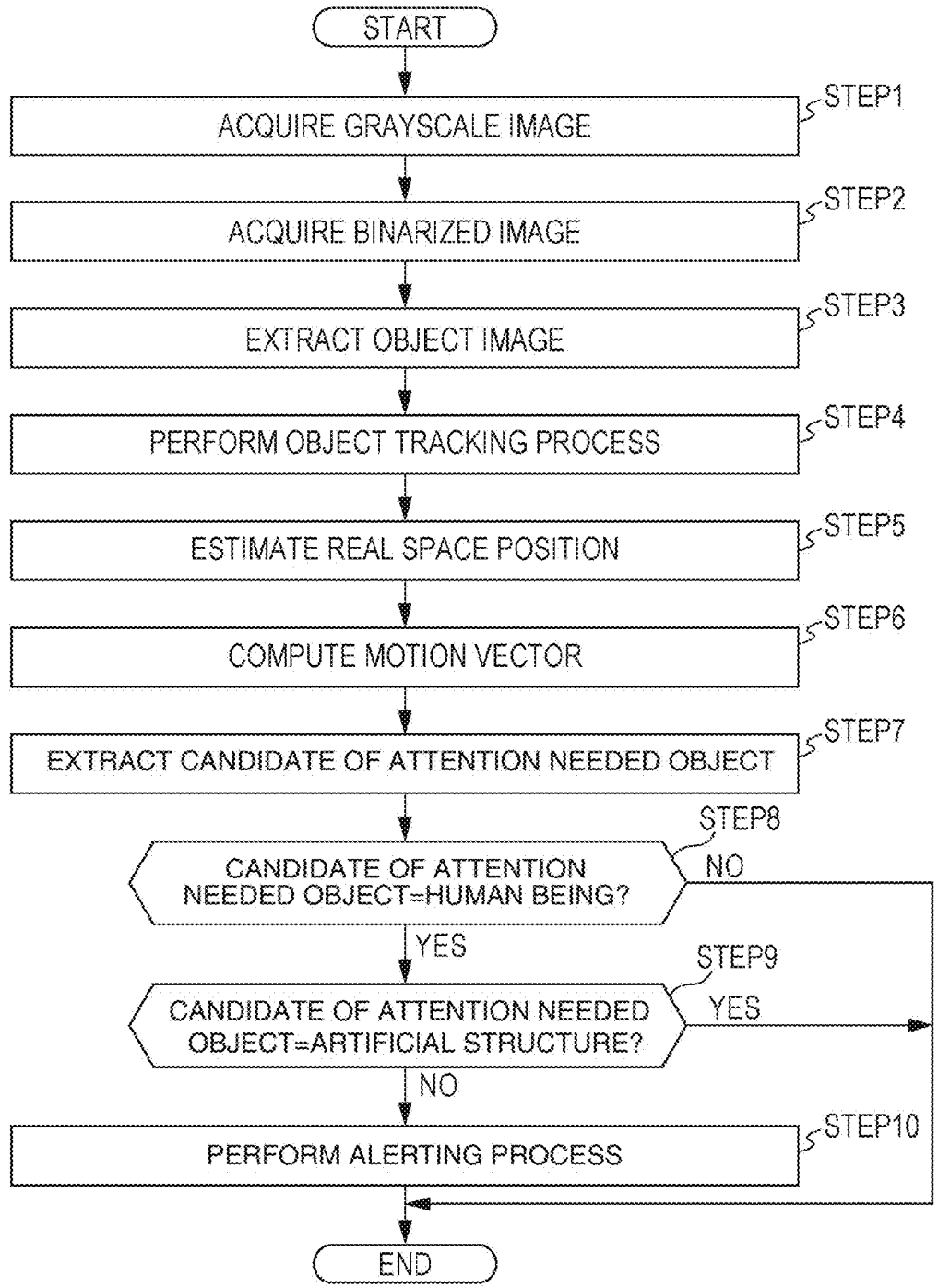
FIG. 3 is a flowchart illustrating the processing performed by the vehicle surroundings monitoring apparatus illustrated in FIG. 2.
Figure 4:
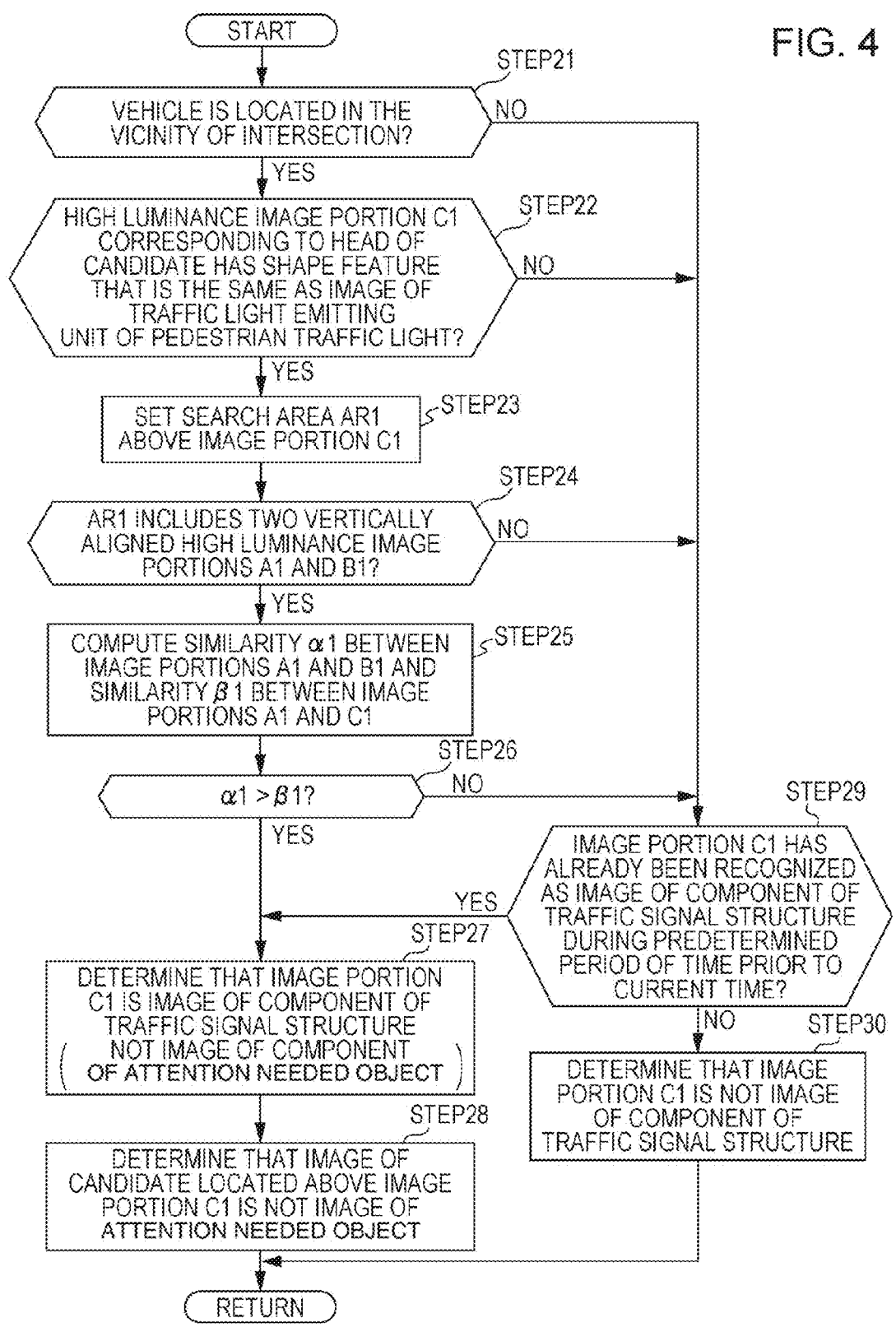
FIG. 4 is a flowchart illustrating the processing performed in step 9 of FIG. 3 according to the first exemplary embodiment.

The vehicle surroundings monitoring apparatus 10 performs the processes indicated by a flowchart in FIG. 3 at predetermined intervals of processing. Steps 1 to 9 of the flowchart illustrate the process performed by the attention needed object detecting unit 21, and step 10 illustrates the process performed by the alerting process unit 22. In addition, the process in step 9 is performed by the structure recognition unit 23.

In step 1, The attention needed object detecting unit 21 of the vehicle surroundings monitoring apparatus 10 acquires the image captured by the infrared camera 11 in the form of a grayscale image by, for example, A/D-converting the image signal (the image signal of each of pixels) output from the infrared camera 11. The grayscale image is formed by representing each of the pixel values of the image captured by the infrared camera 11 using the luminance value. Note that since the infrared camera 11 detects a far infrared light ray, the luminance of the image of an object appearing in the imaging area of the infrared camera 11 is determined in accordance with the temperature of the object.

In step 2, the attention needed object detecting unit 21 binarizes the grayscale image. Thus, the attention needed object detecting unit 21 acquires a binarized image (an image that has only two possible pixel values for each pixel). In this binarization process, the pixels of a grayscale image are classified into two different groups: high luminance pixels having a luminance value higher than or equal to a predetermined threshold value and low luminance pixels having a luminance value lower than the predetermined threshold value. Thereafter, the pixel value of each of the high luminance pixels is set to a predetermined value for high luminance (e.g., "1" (white)), and the pixel value of each of the low luminance pixels is set to a predetermined value for low luminance (e.g., "0" (black)).

Note that the above-described binarized image and the grayscale image are separately stored in the image memory which may be implemented by a storage device.

In step 3, the attention needed object detecting unit 21 acquires the run length data from the binarized image. The run length data represents a line of pixels having high luminance values and continuously arranged in the horizontal direction (a lateral direction) in the binarized image.

In addition, in step 3, the attention needed object detecting unit 21 performs a labeling process in which among the lines represented by the run length data, the lines having an overlapping portion of the binarized image in the vertical direction (a longitudinal direction) are found as one "line group" and defined as one image portion, and an identifier (a label) is assigned to each line group.

Subsequently, in step 3, the attention needed object detecting unit 21 extracts each of the line groups having a label assigned thereto as an object image. Examples of the object image include the image of an artificial structure having a heat generating portion, such as the traffic signal structure 100, in addition to the image of an animal including a human being. In addition, the images of a plurality of partial portions of an object (a plurality of components of an object) may be extracted as different object images.

Figure 5A:
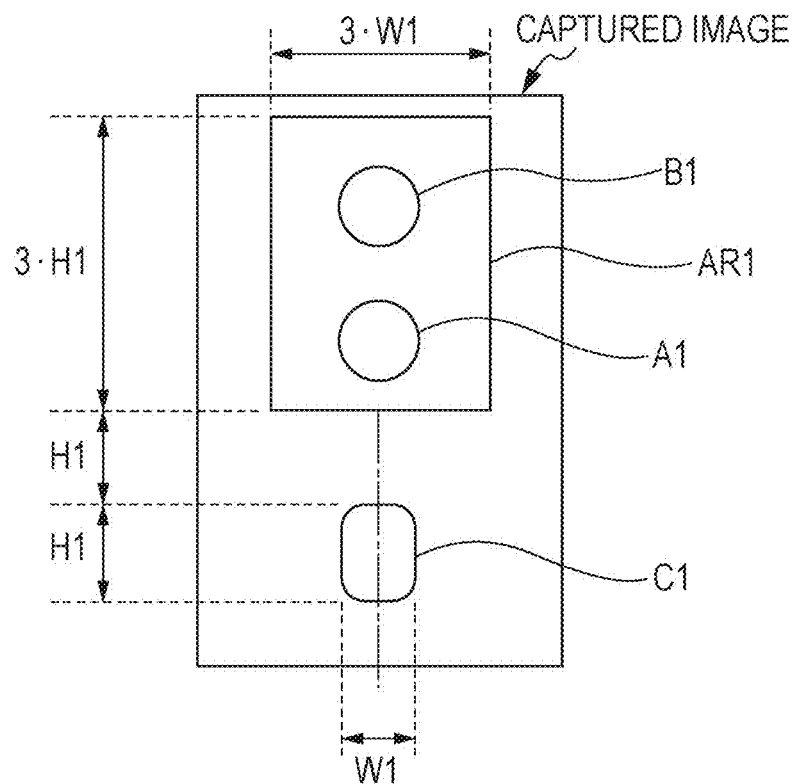
FIGS. 5A and 5B are diagrams used for illustrating the processing of the flowchart illustrated in FIG. 4.
Figure 5B:
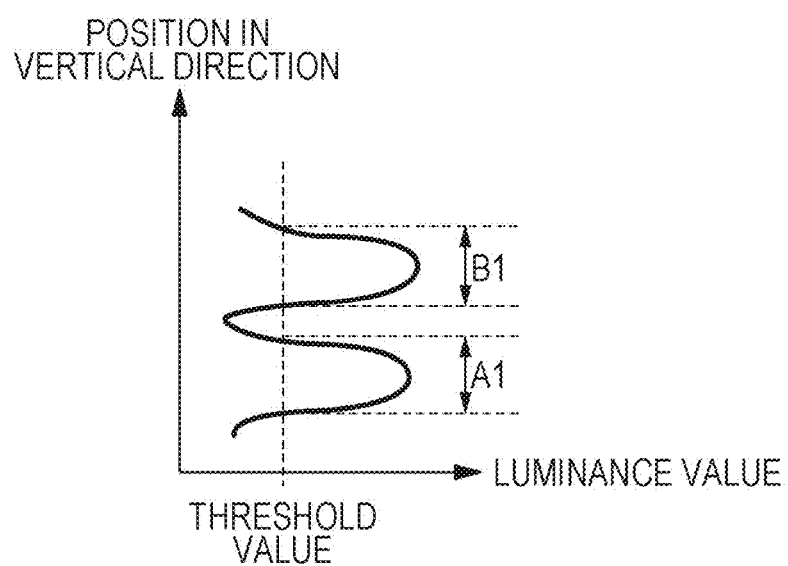

For example, if the traffic signal structure 100 is present in the imaging area of the infrared camera 11, the images of the traffic light emitting units 103 of the vehicle traffic light 104 and the image of the traffic light emitting unit 101 of the pedestrian traffic light 102 (the binarized images) may be extracted as different object images, as indicated by images A1, B1, and C1 illustrated in FIG. 5A. In FIG. 5A, the images A1 and B1 are schematic illustrations of the images of the traffic light emitting units 103 of the vehicle traffic light 104, and the image C1 is a schematic illustration of the traffic light emitting unit 101 of the pedestrian traffic light 102.

In step 4, the attention needed object detecting unit 21 performs an object tracking process in which the image of an object is tracked between an image captured at a previous computational processing cycle (a time t(k−1)) and an image captured in the current computational processing cycle (a time t(k)).

In the object tracking process, it is determined whether object images are the images of the same object by comparing the position of the center of gravity, the dimensions, and the ratio of the vertical length to the horizontal length of the object image extracted in the previous computational processing cycle with those of the object extracted in the current computational processing cycle. The method of such an object tracking process is described in, for example, Japanese Unexamined Patent Application Publication No. 2007-213561, or U.S. Pat. No. 7,586,400, the entire contents of which are incorporated herein by reference.

In step 5, the attention needed object detecting unit 21 estimates the position in a real space of the object from which the object image is extracted. For example, as illustrated in FIG. 1, the real space position of the object is represented as a spatial position in a triaxial reference system (an XYZ coordinate system) (i.e., the position of the object relative to the vehicle 1). Note that in the coordinate system illustrated in FIG. 1, the optical axis direction of the infrared camera 11 is defined as a Z-axis direction, the vehicle width direction of the vehicle 1 (the horizontal direction) is defined as an X-axis direction, and the vertical direction is defined as a Y-axis direction. The origin of the coordinate system is set to the optical center of the infrared camera 11.

In step 5, the real space position of the object is estimated using, for example, the method described in Japanese Unexamined Patent Application Publication No. 2007-213561, or U.S. Pat. No. 7,586,400, the entire contents of which are incorporated herein by reference.

In such a case, the distance from the vehicle 1 to the object (i.e., the position in the Z-axis direction of the coordinate system illustrated in FIG. 1) is computed on the basis of the rate of change with time in the size of the object image (the width of the object image in the horizontal direction or the vertical direction) (i.e., the amount of change for each of the computational processing cycles) and the vehicle speed of the vehicle 1 (a measurement value output from the vehicle speed sensor 13). In addition, the positions of the object in the vehicle width direction and the vertical direction (the X-axis direction and Y-axis direction of the coordinate system illustrated in FIG. 1) are computed using the position of the object image in the image captured by the infrared camera 11, the above-described distance (the position in the Z-axis direction), and the focal length of the infrared camera 11.

Furthermore, the real space position defined by the positions of the object in the X-axis direction, Y-axis direction, and Z-axis direction computed in the above-described manner is corrected in accordance with the amount of change in the heading angle of the vehicle 1 recognized using the detection signal output from the yaw rate sensor 12 (the amount of change for each of the computational processing cycles). In this manner, the final estimated value of the real space position of the object is determined.

Note that if a stereo camera including two infrared cameras is mounted in the vehicle 1, the distance between the vehicle 1 and the object (the position of the object in the Z-axis direction) may be estimated using the stereo distance measurement technique.

Alternatively, by using a so-called motion stereo technique, the real space position of the object can be estimated from the image captured by the single infrared camera 11.

In step 6, the attention needed object detecting unit 21 computes a motion vector of the object. This process computes an approximation straight line that passes through the real space position of the object in the current computational processing cycle and the past real space position of the object for a predetermined period of time prior to the current computational cycle (note that one or more real space position can be used). The direction in which the approximation straight line extends is selected as the direction of the motion vector of the object. More specifically, in this case, the approximation straight line is computed using a method described in, for example, Japanese Unexamined Patent Application Publication No. 2001-6096, or U.S. Pat. No. 6,327,536, the entire contents of which are incorporated herein by reference.

In step 7, among the objects having a real space position and a motion vector computed in the above-described manner, the attention needed object detecting unit 21 extracts candidates of an attention needed object. In this process, among the objects, the attention needed object detecting unit 21 extracts the objects that are likely to collide with the vehicle 1 in the near future as the candidates of the attention needed object. More specifically, in this case, whether the object is likely to collide with the vehicle 1 is determined using, for example, the method described in Japanese Unexamined Patent Application Publication No. 2001-6096, or U.S. Pat. No. 6,327,536, the entire contents of which are incorporated herein by reference.

In brief, the following object is selected as an attention needed object. That is, the distance of the estimated real space position of the object from the vehicle 1 (in the Z-axis direction) is less than or equal to a value obtained by multiplying the vehicle speed of the vehicle 1 by a predetermined margin time. In addition, the object is located in a collision determination area defined as an area having a width that is slightly larger than the width of the vehicle 1 (an area defined between two straight lines each extending in the front-rear direction of the vehicle 1).

Furthermore, the following object is selected as an attention needed object. That is, the estimated real space position of the object is located in predetermined approach determination areas defined on either side of the collision determination area (on either side in the vehicle width direction), and the motion vector of the object is directed to the front of the vehicle 1.

In step 8, the attention needed object detecting unit 21 determines whether each of the candidates for the attention needed object extracted as an object that is likely to collide with the vehicle 1 in the above-described manner is a human being (a pedestrian) on the basis of the feature of the image of the candidate (e.g., the size and shape of the image of the candidate).

This determination process is performed by using, for example, the technique described in Japanese Unexamined Patent Application Publication No. 2003-284057, or U.S. Pat. No. 7,130,448, the entire contents of which are incorporated herein by reference.

In such a case, in step 8, an artificial structure, which is not a human being, may be recognized as a human being (a pedestrian). For example, as noted above, if the image of the traffic signal structure 100 is found in the image captured by the infrared camera 11, the image of the traffic light emitting unit 101 of the pedestrian traffic light 102 may be recognized as the image of the head of a human being. In addition, the image of a portion of the pole 105 under the pedestrian traffic light 102 may be recognized as the image of the body of the human being.

Accordingly, if the determination made in step 8 is "YES", the attention needed object detecting unit 21, in step 9, further determines whether the candidate of the attention needed object (the candidate selected as a human being in step 8) is an artificial structure, such as the traffic signal structure 100. This determination process is performed by the structure recognition unit 23.

In this determination process, as in the technique described in Japanese Unexamined Patent Application Publication No. 2003-284057, or U.S. Pat. No. 7,130,448, the structure recognition unit 23 determines that the candidate of the attention needed object corresponding to the image is an artificial structure if the image of the candidate of the attention needed object has a feature that is not found in the images of human beings (e.g., the image has a straight line edge, the angle of a corner of the image is a right angle, or the image has a plurality of portions having the same shape).

In addition, according to the present exemplary embodiment, the structure recognition unit 23 determines whether the image of the candidate of the attention needed object is the image of a component of the traffic signal structure 100. Such determination is described in more detail below.

If the determination made in step 9 is "NO" (if it is determined that the candidate of the attention needed object is not an artificial structure), the vehicle surroundings monitoring apparatus 10 causes the alerting process unit 22 to perform the process in step 10 (i.e., the alerting process).

In this process, the alerting process unit 22 finally determines that the candidate of the attention needed object obtained when the determination made in step 8 is "YES" and the determination made in step 9 is "NO" (i.e., the candidate having a type of human being and determined not to be an artificial structure) is an attention needed object. Thereafter, the alerting process unit 22 performs the alerting process so that the driver is alerted to the attention needed object. In such a case, according to the present exemplary embodiment, as described above, the alerting process unit 22 performs the process of outputting speech sound or alarm sound for attracting the attention of the driver from the speaker 15 and the process of displaying the image captured by the infrared camera 11 (the grayscale image) on the display unit 16 and emphasizing the image of the attention needed object in the captured image.

Note that in the alerting process, one of the operation of the speaker 15 and the emphasized display performed by the display unit 16 may be performed. Furthermore, in addition to audio alert or visual alert, the driver may be alerted via physical stimulus, such as vibration of the driver seat. Still furthermore, for example, in addition to alerting the driver, the braking force generated by a braking system in accordance with an operation performed on a brake pedal may be increased from that in a normal case (the case in which the attention needed object is not found).

As described above, the vehicle surroundings monitoring apparatus 10 performs such processes. Note that if the determination made in step 8 is "NO" or if the determination made in step 9 is "YES", the candidate of the attention needed object (the candidate that is determined not to be a human being or that is determined to be an artificial structure) is recognized as a non-attention needed object. Accordingly, the alerting process is not performed for the candidate.

The determination process performed in step 9 as to whether the image of the candidate of the attention needed object (the candidate that is recognized as a human being in step 8) is the image of one of the components of the traffic signal structure 100 is described in detail next. This process is performed by the structure recognition unit 23 as illustrated in the flowchart in FIG. 4. Note that the description is made using an example in which the image of the traffic signal structure 100 is found in the image captured by the infrared camera 11. The structure recognition unit 23 performs or provides various functions such as those described in the first and second exemplary embodiments by means of a CPU which executes a program. In the present application, the term program generally refers to a set of coded instructions that enable a computer to perform a specified function. Programs may be generally stored on a storage device such as memory. Further, programs may be implemented internally or externally to a system, while remaining accessible by that system.

In step 21, the structure recognition unit 23 determines whether the vehicle 1 is currently located in the vicinity of an intersection (at a location within a predetermined distance from the intersection). In such a case, it is determined whether the vehicle 1 is currently located in the vicinity of the intersection on the basis of the image captured by the infrared camera 11 or the current location information about the vehicle 1 output from a navigation system (not illustrated) mounted in the vehicle 1.

If, in step 21, the determination is "YES", it is further determined whether the image of the candidate of an attention needed object is the image of one of the components of the traffic signal structure 100 through the processes starting from step 22.

In step 22, the structure recognition unit 23 determines whether the high luminance image portion C1 corresponding to the head of a human being in the image of a candidate of an attention needed object recognized as a human being in step 8 (a grayscale image) has a shape feature that is the same as that of the image of the traffic light emitting unit 101 of the pedestrian traffic light 102 of the traffic signal structure 100. In this case, the high luminance image portion C1 corresponding to the head of a human being is defined as a portion of the upper end section of the image of the candidate of an attention needed object having a luminance value that is higher or equal to a predetermined value. In addition, the high luminance image portion C1 is a portion recognized as the head of a human being in the process performed in step 8.

If the image of the traffic signal structure 100 is included in the image captured by the infrared camera 11, the image of the traffic light emitting unit 101 of the pedestrian traffic light 102 may be recognized as the image of the head of a human being in step 8, as described above. In addition, the image of the lower portion of the pole 105 under the pedestrian traffic light 102 may be recognized as the image of the body of the human being. In such a case, for example, as illustrated in FIG. 5A, the image C1 of the traffic light emitting unit 101 of the pedestrian traffic light 102 is defined as the high luminance image portion C1 corresponding to the head of a human being.

The traffic light emitting unit 101 of the pedestrian traffic light 102 is substantially rectangular. Accordingly, if the high luminance image portion C1 corresponding to the head of a human being is the image of the traffic light emitting unit 101 of the pedestrian traffic light 102, the high luminance image portion C1 has a shape close to a rectangular shape, in general. Therefore, in step 22, the structure recognition unit 23 determines whether the shape (the external shape) of the high luminance image portion C1 corresponding to the head of a human being is rectangular or close to a rectangular shape using an existing technique (e.g., pattern matching). In this manner, the structure recognition unit 23 determines whether the high luminance image portion C1 has a shape feature that is the same as that of the image of the traffic light emitting unit 101 of the pedestrian traffic light 102.

If the determination made in step 22 is "YES", the structure recognition unit 23, in step 23, sets, in the image captured by the infrared camera 11 at a predetermined position above the high luminance image portion C1 corresponding to the head, a search area AR1 in which the images of the traffic light emitting units 103 of the vehicle traffic light 104 are search for, as illustrated in FIG. 5A.

The search area AR1 is a rectangular area having a vertical width and a horizontal width that are larger than a vertical width H1 and a horizontal width W1 of the high luminance image portion C1, respectively, by a predetermined percent (e.g., a vertical width that is three times H1 and a horizontal width that is three times W1). The search area AR1 is set at a position a predetermined distance away from the upper end of the high luminance image portion C1. The predetermined distance is determined in accordance with the size of the high luminance image portion C1 (e.g., a distance that is the same as H1). In addition, the position of the search area AR1 in the horizontal direction is determined so that the middle point of the horizontal width of the search area AR1 coincides with the middle point of the horizontal width of the high luminance image portion C1.

Note that the size (the vertical width and the horizontal width) and the position of the search area AR1 may be set so as to be variable in accordance with, for example, the distance of the candidate of an attention needed object corresponding to the high luminance image portion C1 from the vehicle 1.

In step 24, the structure recognition unit 23 determines whether two vertically aligned high luminance image portions A1 and B1 (lined up side by side vertically) are found in the search area AR1 set in the above-described manner. This determination is made by determining whether the luminance distribution of the search area AR1 (the luminance distribution in the vertical direction) includes regions each having a luminance value higher than or equal to a predetermined threshold value with a pattern illustrated in FIG. 5B (indicated by "A1" and "B1" in FIG. 5B).

If the high luminance image portion C1 corresponding to the head is the image of the traffic light emitting unit 101 of the pedestrian traffic light 102, the search area AR1 generally includes the high luminance image portions A1 and B1 each corresponding to one of the traffic light emitting units 103 of the vehicle traffic light 104, as illustrated in FIG. 5A. In such a case, the determination made in step 24 is "YES".

Note that in general, if the search area AR1 includes the high luminance image portions A1 and B1 each corresponding to one of the traffic light emitting units 103 of the vehicle traffic light 104, the shape of each of the high luminance image portions A1 and B1 is substantially circular. Accordingly, it may be determined whether the search area AR1 includes high luminance image portions A1 and B1 each having a circular shape using an existing technique, such as pattern matching.

If, in step 24, the determination is "YES", the structure recognition unit 23 performs the process in step 25. In step 25, the structure recognition unit 23 computes a similarity $\alpha 1$ between the high luminance image portions A1 and B1 found in the search area AR1 and a similarity $\beta 1$ between one of the high luminance image portions A1 and B1 (e.g., A1 according to the present exemplary embodiment) and the high luminance image portion C1 located below the one of the high luminance image portions. The similarities $\alpha 1$ and $\beta 1$ represent the similarities regarding the luminance distribution or the shape.

At that time, when each of the high luminance image portions A1 and B1 corresponds to one of the traffic light emitting units 103 of the vehicle traffic light 104 and if the high luminance image portion C1 corresponds to the image of the traffic light emitting unit 101 of the pedestrian traffic light 102, the sizes, the shapes, and the luminance distributions of the high luminance image portions A1 and B1 are similar to each other, in general. In contrast, the similarity of the shape and the luminance distribution between the high luminance image portion C1 corresponding to the traffic light emitting unit 101 of the pedestrian traffic light 102 and each of the high luminance image portions A1 and B1 corresponding to one of the traffic light emitting units 103 of the vehicle traffic light 104 is low, in general.

Accordingly, in step 25, the similarities $\alpha 1$ and $\beta 1$ are computed. In such a case, for example, the similarity $\alpha 1$ is computed through correlation computation, such as SSD (Sum of Squared Difference) or SAD (Sum of Absolute Difference) for the luminance distributions of the high luminance image portions A1 and B1. Alternatively, the similarity $\alpha 1$ between the shapes of the high luminance image portions A1 and B1 may be computed by computing the difference in a vertical width, the difference in a horizontal width, and the difference in aspect ratio between the high luminance image portions A1 and B1.

Like the similarity $\alpha 1$, the similarity $\beta 1$ can be computed.

In step 26, the structure recognition unit 23 compares the similarity $\alpha 1$ with the similarity $\beta 1$ obtained in step 25 and determines whether $\alpha 1 > \beta 1$.

When each of the high luminance image portions A1 and B1 corresponds to one of the real traffic light emitting units 103 of the vehicle traffic light 104 and if the high luminance image portion C1 corresponds to the image of the real traffic light emitting unit 101 of the pedestrian traffic light 102, the similarity $\alpha 1$ between the high luminance image portions A1 and B1 is higher than the similarity $\beta 1$ between the high luminance image portion A1 (or the high luminance image portion B1) and the high luminance image portion C1. Accordingly, $\alpha 1 > \beta 1$ is obtained.

Therefore, if the determination made in step 26 is "YES", the structure recognition unit 23, in step 27, determines that in reality, the high luminance image portion C1 recognized as the head of a human being is one of the components of the traffic signal structure 100 which is an artificial structure. That is, it is determined that the high luminance image portion C1 is not the image of one of the components of the attention needed object.

In such a case, in addition to the high luminance image portion C1, it may be determined that each of the high luminance image portions A1 and B1 is also one of the components of the traffic signal structure 100 (i.e., each of the high luminance image portions A1 and B1 is not one of the components of the attention needed object).

As described above, through steps 22 to 26, it is determined whether the high luminance image portions A1 and B1 that are lined up side by side vertically are included in the search area AR1 located above the high luminance image portion C1 recognized as the head of a human being, and a set of the high luminance image portions A1, B1, and C1 having at least a feature indicating that the similarity α1 between the high luminance image portions A1 and B1 is higher than the similarity β1 between the high luminance image portion A1 (or the high luminance image portion B1) and the high luminance image portion C1 is found in the image captured by the infrared camera 11. Note that the set of the high luminance image portions A1, B1, and C1 corresponds to a "featured image portion group" of the present disclosure. If a set of the high luminance image portions A1, B1, and C1 having such a feature is found, the determinations made in steps 22, 24, and 26 are all "YES". Accordingly, it is determined that the high luminance image portion C1 (or all of the high luminance image portions A1, B1, and C1) is one of the components of the traffic signal structure 100 (i.e., the high luminance image portion C1 is not the image of one of the components of the attention needed object).

In step 28, the structure recognition unit 23 determines that the object image (including the high luminance image portion A1 and B1) located above the high luminance image portion C1 in the image captured by the infrared camera 11 is not the image of the attention needed object.

In general, since the traffic light emitting unit 101 of the pedestrian traffic light 102 of the traffic signal structure 100 is mounted at a height of about 2.5 m in the real space, it is highly unlikely that the head of a human being is located at a position higher than the traffic light emitting unit 101.

For this reason, according to the present exemplary embodiment, the process in step 28 is performed. In this manner, if, in step 8, it is determined that part of the image of a human being, which is the attention needed object, is found above the high luminance image portion C1, it is determined that the image is not an image of the attention needed object without performing the processes from step 22 to step 26.

However, if any one of the determinations made in steps 21, 22, 24, and 26 is "NO", the structure recognition unit 23, in step 29, determines whether the high luminance image portion C1 has already been recognized as the image of one of the components of the traffic signal structure 100 in step 27 during a predetermined period of time prior to the current time.

Note that even during a period of time during which the traffic signal structure 100 continuously appears in the imaging area of the infrared camera 11, the determination made in one of steps 22, 24, and 26 may be temporarily and falsely "NO" due to, for example, an external disturbance on the captured image.

Therefore, according to the present exemplary embodiment, if the determination made in step 29 is "YES", the structure recognition unit 23 performs the process in step 27. Thus, the structure recognition unit 23 determines that the high luminance image portion C1 recognized as the image of the head of a human being is the image of one of the components of the traffic signal structure 100 (i.e., the high luminance image portion C1 is not the image of one of the components of the attention needed object).

In this manner, if, at some point in time, the high luminance image portion C1 recognized as the image of the head of a human being is determined to be the image of one of the components of the traffic signal structure 100, the high luminance image portion C1 is continuously recognized as the image of one of the components of the traffic signal structure 100 for at least a predetermined period of time after that point in time, for example, over several repeating cycles of the process of FIG. 3. Thus, frequent change in the result of determination as to whether the high luminance image portion C1 is the image of one of the components of the traffic signal structure 100 caused by, for example, an external disturbance on the image captured by the infrared camera 11 can be prevented.

However, if the determination made in step 29 is "NO", the structure recognition unit 23, in step 30, determines that the high luminance image portion C1 is not the image of one of the components of the traffic signal structure 100.

Note that if the determination made in step 21 is "NO", the determination to be made in step 29 may be skipped, and the process in step 30 may be performed.

As described in detail above, in step 9, the structure recognition unit 23 determines whether the image of the candidate of an attention needed object (i.e., the candidate recognized as a human being in step 8) is the image of one of the components of the traffic signal structure 100.

According to the above-described present exemplary embodiment, false recognition in which the traffic signal structure installed in the traffic environment in the United States is falsely recognized as an attention needed object can be prevented. Thus, the performance of the alerting process in which the driver is alerted to the traffic signal structure can be prevented. That is, an unnecessary alert to the driver can be prevented.

In addition, on condition that the vehicle 1 is located in the vicinity of an intersection in which the traffic signal structure 100 is mainly installed, the processes in steps 22 to 26 are performed. That is, the process of determining whether a set of the high luminance image portions A1, B1, and C1 (a featured image portion group) that makes the determinations made in steps 22, 24, and 26 "YES" is present is performed. Thus, the processing load imposed on the vehicle surroundings monitoring apparatus 10 can be reduced.

Furthermore, if it is determined that the high luminance image portion C1 is the image of one of the components of the traffic signal structure 100, it is determined that the image of a candidate of an attention needed object located above the high luminance image portion C1 in the image captured by the infrared camera 11 is not the image of an attention needed object without performing the processes in steps 22 to 26. Thus, the processing load imposed on the vehicle surroundings monitoring apparatus 10 can be further reduced.

Second Exemplary Embodiment

A second exemplary embodiment of the present disclosure is described below with reference to FIGS. 7 to 9. Note that the present exemplary embodiment relates to a vehicle traveling in Japan. In addition, the second exemplary embodiment differs from the first exemplary embodiment only in the process performed by the structure recognition unit 23 of the vehicle surroundings monitoring apparatus 10. Accordingly, the difference is mainly described, and descriptions of the processes that are the same as in the first exemplary embodiment are not repeated.

Figure 9:
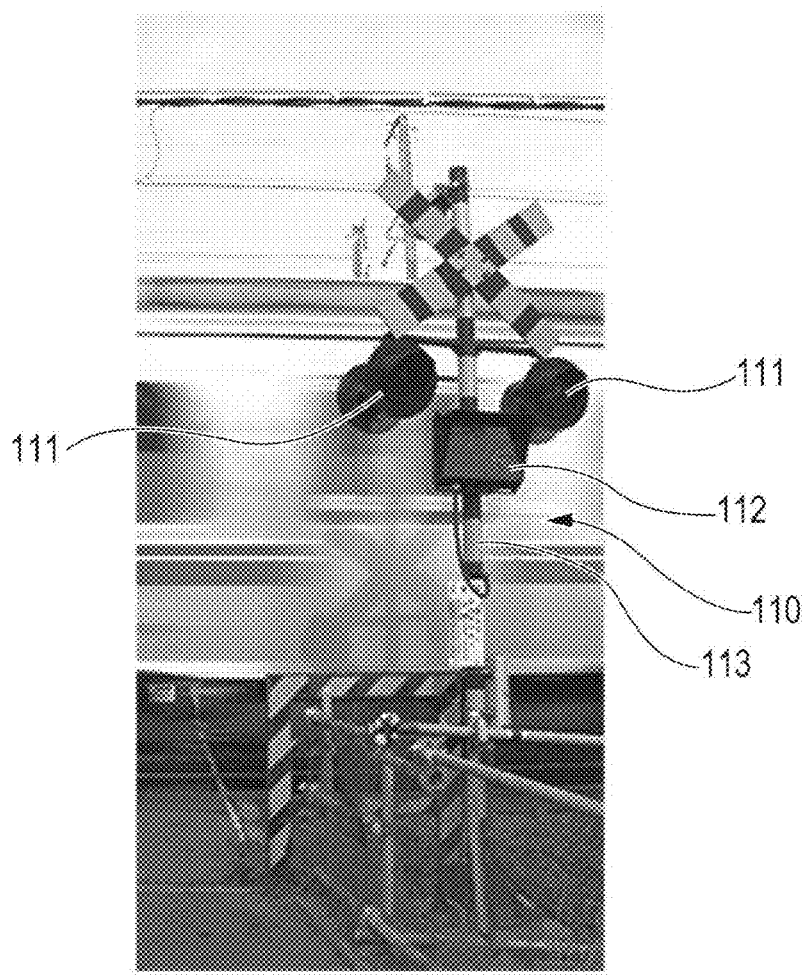
FIG. 9 illustrates an example of a traffic signal structure related to the processing illustrated by the flowchart in FIG. 7.

According to the present exemplary embodiment, instead of determining whether the image of a candidate of an attention needed object (a candidate recognized as a human being in step 8 of FIG. 3) is the image of one of the components of the traffic signal structure 100 in the United States, the structure recognition unit 23 of the vehicle surroundings monitoring apparatus 10 determines whether the image of a candidate of an attention needed object is the image of one of the components of the traffic signal structure 110 installed in a railway crossing in Japan (refer to FIG. 9).

Figure 7:
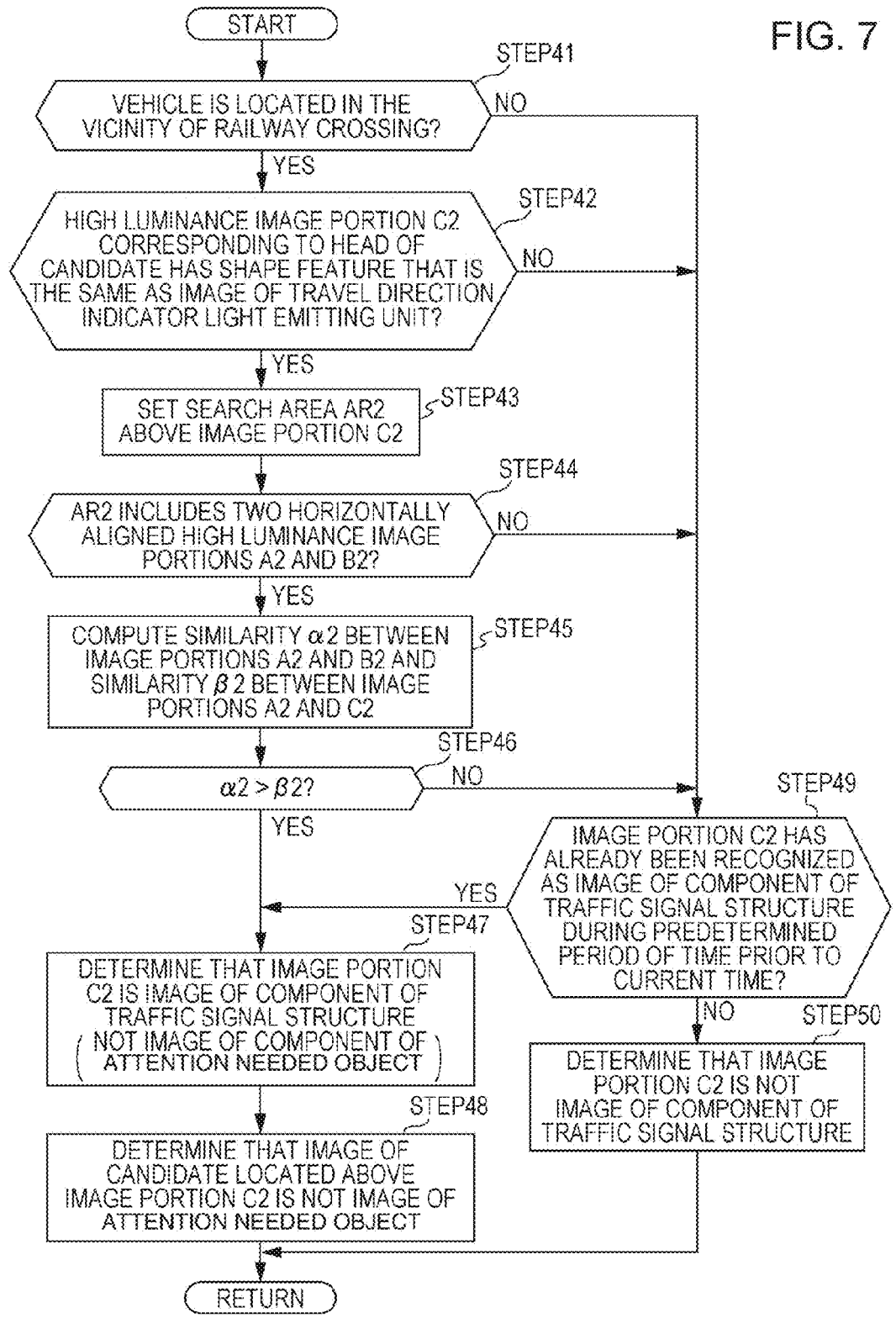
FIG. 7 is a flowchart illustrating the processing performed in step 9 of FIG. 3 according to the second exemplary embodiment.

The determination process is performed as indicated by a flowchart illustrated in FIG. 7. The processing indicated by the flowchart illustrated in FIG. 7 is described next on condition that the traffic signal structure 110 as illustrated in FIG. 9 is present in an image captured by the infrared camera 11.

In step 41, the structure recognition unit 23 determines whether the vehicle 1 is currently located in the vicinity of a railway crossing (in an area within a predetermined distance from the railway crossing). In such a case, like step 21 illustrated in FIG. 4, the determination as to whether the vehicle 1 is located in the vicinity of the railway crossing is made on the basis of the image captured by the infrared camera 11 or the current location information about the vehicle 1 output from a navigation system (not illustrated).

If the determination made in step 41 is "YES", the structure recognition unit 23, in step 42, further determines whether the image of a candidate of an attention needed object is one of the components of the traffic signal structure 110.

In step 42, the structure recognition unit 23 determines whether in the image of the candidate of an attention needed object recognized as a human being in step 8 (a grayscale image), a high luminance image portion C2 corresponding to the head of a human being has a shape feature that is the same as the image of the travel direction indicator light emitting unit 112 of the traffic signal structure 110. In such a case, like the high luminance image portion C1 in the first exemplary embodiment, the high luminance image portion C2 corresponding to the head of a human being is defined as the upper end section of the image of the candidate of an attention needed object having a luminance value that is higher or equal to a predetermined value. In addition, the high luminance image portion C2 is an image portion recognized as the image of the head of a human being in the process performed in step 8.

If the image of the traffic signal structure 110 is included in the image captured by the infrared camera 11, the image of the travel direction indicator light emitting unit 112 may be recognized as the image of the head of a human being in step 8. In addition, the image of the lower portion of the pole 113 under the travel direction indicator light emitting unit 112 may be recognized as the image of the body of the human being. In such a case, for example, as illustrated in FIG. 8A, the image C2 of the travel direction indicator light emitting unit 112 is recognized as the high luminance image portion C2 corresponding to the head of a human being.

The travel direction indicator light emitting unit 112 is substantially rectangular. Accordingly, if the high luminance image portion C2 corresponding to the head of a human being is the image of the real travel direction indicator light emitting unit 112, the high luminance image portion C2 has a shape close to a rectangular shape, in general. Therefore, in step 42, the structure recognition unit 23 determines whether the shape (the external shape) of the high luminance image portion C2 corresponding to the head of a human being is rectangular or close to a rectangular shape using an existing technique, such as pattern matching. In this manner, the structure recognition unit 23 determines whether the high luminance image portion C2 has a shape feature that is the same as that of the image of the travel direction indicator light emitting unit 112.

Figure 8A:
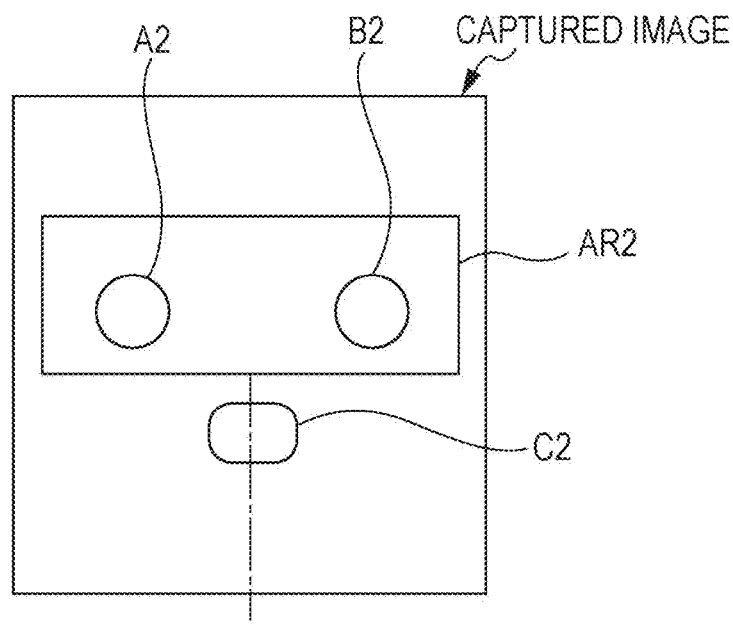
FIGS. 8A and 8B are diagrams used for illustrating the processing of the flowchart illustrated in FIG. 7.
Figure 8B:
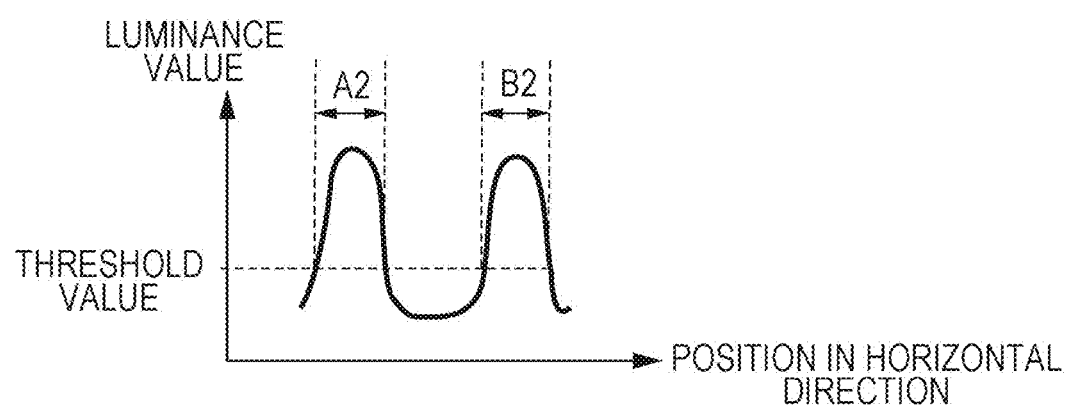

If the determination made in step 42 is "YES", the structure recognition unit 23, in step 43, sets, in the image captured by the infrared camera 11 at a predetermined position above the high luminance image portion C2 corresponding to the head, a search area AR2 in which the images of the traffic light emitting units 111 of the traffic signal structure 110 are search for, as illustrated in FIG. 8A.

Like the search area AR1 in the first exemplary embodiment, the search area AR2 is a rectangular area having a vertical width and a horizontal width that are determined in accordance with the size (the vertical width and horizontal width) of the high luminance image portion C2. The search area AR2 is set at a position a predetermined distance away from the upper end of the high luminance image portion C2. The predetermined distance is determined in accordance with the size of the high luminance image portion C2. In addition, the position of the search area AR2 in the horizontal direction is determined so that the middle point of the horizontal width of the search area AR2 coincides with the middle point of the horizontal width of the high luminance image portion C2.

Note that the size (the vertical width and the horizontal width) and the position of the search area AR2 may be set so as to be variable in accordance with, for example, the distance of the candidate of an attention needed object corresponding to the high luminance image portion C2 from the vehicle 1.

In step 44, the structure recognition unit 23 determines whether two horizontally aligned high luminance image portions A2 and B2 (lined up side by side horizontally) are found in the search area AR2 set in the above-described manner. This determination is made by determining whether the luminance distribution of the search area AR2 (the luminance distribution in the horizontal direction) includes regions each having a luminance value higher than or equal to a predetermined threshold value with a pattern illustrated in FIG. 8B (indicated by "A2" and "B2" in FIG. 8B).

If the high luminance image portion C2 corresponding to the head is the image of the travel direction indicator light emitting unit 112, the search area AR2, in general, includes the high luminance image portions A2 and B2 each corresponding to one of the intermittent light emitting units 111, as illustrated in FIG. 8A. In such a case, the determination made in step 44 is "YES".

Note that in general, if the search area AR2 includes the high luminance image portions A2 and B2 each corresponding to one of the intermittent light emitting units 111 of the traffic signal structure 110, the shape of each of the high luminance image portions A2 and B2 is substantially circular. Accordingly, it may be determined whether the search area AR2 includes high luminance image portions A2 and B2 each having a circular shape using an existing technique, such as pattern matching.

If, in step 44, the determination is "YES", the structure recognition unit 23 performs the process in step 45. In step 45, like step 25 of the first exemplary embodiment, the structure recognition unit 23 computes a similarity α2 between the high luminance image portions A2 and B2 found in the search area AR2 and a similarity β2 between one of the high luminance image portions A2 and B2 (e.g., A2 according to the present exemplary embodiment) and the high luminance image portion C2 located below the one of the high luminance image portions. The similarities α2 and β2 represent the similarities regarding the luminance distribution or the shape. The similarities α2 and β2 are computed using the technique used in the first exemplary embodiment.

In step 46, the structure recognition unit 23 compares the similarity α2 with the similarity β2 obtained in step 45 and determines whether α2>β2.

When each of the high luminance image portions A2 and B2 corresponds to one of the intermittent light emitting units 111 of the actual traffic signal structure 110 and if the high luminance image portion C2 corresponds to the actual travel direction indicator light emitting unit 112 of the traffic signal structure 110, the high luminance image portions A2 and B2 have the shapes (including the sizes) and the luminance distributions that are similar to each other, in general. In contrast, the similarity between the shape (and the luminance distribution) of the high luminance image portion C2 corresponding to the image of the travel direction indicator light emitting unit 112 and each of the shape (and the luminance distribution) of the high luminance image portions A2 and B2 corresponding to the intermittent light emitting units 111 is low. Accordingly, α2>β2 is obtained.

Therefore, if the determination made in step 46 is "YES", the structure recognition unit 23, in step 47, determines that in reality, the high luminance image portion C2 recognized as the head of a human being is one of the components of the traffic signal structure 110 which is an artificial structure. That is, the structure recognition unit 23 determines that the high luminance image portion C2 is not the image of a component of the attention needed object.

In such a case, in addition to the high luminance image portion C2, it may be determined that each of the high luminance image portions A2 and B2 is also a component of the traffic signal structure 110 (i.e., each of the high luminance image portions A2 and B2 is not one of the components of an attention needed object).

As described above, through steps 42 to 46, it is determined whether the high luminance image portions A2 and B2 that are lined up side by side horizontally are included in the search area AR2 located above the high luminance image portion C2 recognized as the head of a human being, and a set of the high luminance image portions A2, B2, and C2 having at least a feature indicating that the similarity α2 between the high luminance image portions A2 and B2 is higher than the similarity β2 between the high luminance image portion A2 (or the high luminance image portion B2) and the high luminance image portion C2 is found in the image captured by the infrared camera 11. Note that the set of the high luminance image portions A2, B2, and C2 corresponds to a "featured image portion group" of the present disclosure. If a set of the high luminance image portions A2, B2, and C2 having such a feature is found, the determinations made in steps 42, 44, and 46 are all "YES". Accordingly, it is determined that the high luminance image portion C2 (or all of the high luminance image portions A2, B2, and C2) is one of the components of the traffic signal structure 110 (i.e., the high luminance image portion C2 is not the image of one of the components of the attention needed object).

Like step 28 of the first exemplary embodiment, in step 48, the structure recognition unit 23 determines that the object image located above the high luminance image portion C2 in the image captured by the infrared camera 11 is not the image of an attention needed object.

In this manner, if, in step 8, it is determined that part of the image of a human being, which is an attention needed object, is found above the high luminance image portion C2, it is determined that the image is not the image of an attention needed object without performing the processes from step 42 to step 46.

However, if any one of the determinations made in steps 41, 42, 44, and 46 is "NO", the structure recognition unit 23, in step 49, performs a determination process that is the same as in step 29 of the first exemplary embodiment. That is, the structure recognition unit 23 determines whether the high luminance image portion C2 has already been recognized as the image of one of the components of the traffic signal structure 110 in step 47 during a predetermined period of time prior to the current time.

If the determination made in step 49 is "YES", the structure recognition unit 23 performs the process in step 47 and determines that the high luminance image portion C2 recognized as the head of a human being is the image of one of the components of the traffic signal structure 110 (i.e., the high luminance image portion C2 is not the image of one of the components of an attention needed object).

In this manner, if, at some point in time, the high luminance image portion C2 recognized as the image of the head of a human being is determined to be the image of one of the components of the traffic signal structure 110, the high luminance image portion C2 is continuously recognized as the image of one of the components of the traffic signal structure 110 for at least a predetermined period of time after that point in time. Thus, under condition that the traffic signal structure 110 is found in the imaging area of the infrared camera 11, frequent change in the result of determination as to whether the high luminance image portion C2 corresponding to the image of the actual travel direction indicator light emitting unit 112 is the image of one of the components of the traffic signal structure 110 caused by, for example, an external disturbance on the image captured by the infrared camera 11 can be prevented.

However, if the determination made in step 49 is "NO", the structure recognition unit 23, in step 50, determines that the high luminance image portion C2 is not the image of one of the components of the traffic signal structure 110.

Note that if the determination made in step 41 is "NO", the determination to be made in step 49 may be skipped, and the process in step 50 may be performed.

As described in detail above, in step 9, the structure recognition unit 23 determines whether the image of a candidate of an attention needed object (i.e., the candidate recognized as a human being in step 8) is the image of one of the components of the traffic signal structure 110.

According to the above-described present exemplary embodiment, false recognition in which the traffic signal structure installed at a railway crossing in Japan is falsely recognized as an attention needed object can be prevented. Thus, the performance of the alerting process in which the driver is alerted to the traffic signal structure can be prevented. That is, an unnecessary alert to the driver can be prevented.

In addition, on condition that the vehicle 1 is located in the vicinity of a railway crossing in which the traffic signal structure 110 is installed, the processes in steps 42 to 46 are performed. That is, the process of determining whether a set of the high luminance image portions A2, B2, and C2 (a featured image portion group) that makes the determinations made in steps 42, 44, and 46 all "YES" is present is performed. Thus, the processing load imposed on the vehicle surroundings monitoring apparatus 10 can be reduced.

Furthermore, if it is determined that the high luminance image portion C2 is the image of one of the components of the traffic signal structure 110, it is determined that the image of a candidate of an attention needed object located above the high luminance image portion C2 in the image captured by the infrared camera 11 is also not the image of the attention needed object without performing the processes in step 42 to step 46. Thus, the processing load imposed on the vehicle surroundings monitoring apparatus 10 can be further reduced. While aspects of the subject matter described herein involve various modifications and alternative constructions, certain illustrated embodiments thereof are shown in the drawings and have been described above in detail. It should be noted, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

I claim:

1. A vehicle surroundings monitoring apparatus for performing an object recognition on an object located in the vicinity of a vehicle on the basis of an image captured by an infrared camera mounted in the vehicle, comprising:
   a structure recognition unit that detects whether a featured image portion group is included in the captured image, the featured image portion group including:
      i) first and second high luminance image portions lined up side by side vertically or horizontally and a third high luminance image portion located below the first and second high luminance image portions, and
      ii) a feature indicating that a similarity of one of a luminance distribution and a shape between the first high luminance image portion and the second high luminance image portion is higher than between the third high luminance image portion and at least one of the first and second high luminance image portions,
   wherein upon detecting the featured image portion group in the captured image, the structure recognition unit determines that at least the third high luminance image portion is an image of a component of a traffic signal structure.

2. The vehicle surroundings monitoring apparatus according to claim 1, wherein the featured image portion group includes the first and second high luminance image portions lined up side by side vertically and the third high luminance image portion located below the first and second high luminance image portions, and
   wherein upon detecting the featured image portion group in the captured image, the structure recognition unit determines that at least the third high luminance image portion is an image of a component of a traffic signal structure installed on a road in the United States.

3. The vehicle surroundings monitoring apparatus according to claim 1, wherein the featured image portion group includes the first and second high luminance image portions lined up side by side horizontally and the third high luminance image portion located below the first and second high luminance image portions, and
   wherein upon detecting the featured image portion group in the captured image, the structure recognition unit determines that at least the third high luminance image portion is an image of a component of a traffic signal structure installed in a railway crossing in Japan.

4. The vehicle surroundings monitoring apparatus according to claim 2, wherein the structure recognition unit determines whether the vehicle is located in the vicinity of an intersection, and if so, the structure recognition unit detects whether the featured image portion group is included in the captured image.

5. The vehicle surroundings monitoring apparatus according to claim 3, wherein the structure recognition unit determines whether the vehicle is located in the vicinity of a railway crossing, and if so, the structure recognition unit detects whether the featured image portion group is included in the captured image.

6. The vehicle surroundings monitoring apparatus according to claim 1, further comprising:
   an attention needed object detecting unit that detects, from the captured image, an image of an attention needed object of predetermined types including at least a human being; and
   an alerting unit that performs a process for alerting a driver of the vehicle to the attention needed object when the attention needed object is detected,
   wherein if the structure recognition unit determines that the third high luminance image portion is the image of one of the components of the traffic signal structure, the attention needed object detecting unit determines that at least the third high luminance image portion is not the image of the attention needed object.

7. The vehicle surroundings monitoring apparatus according to claim 6, wherein if the structure recognition unit determines that the third high luminance image portion is the image of one of the components of the traffic signal structure, the attention needed object detecting unit continues to determine that at least the third high luminance image portion is not the image of the attention needed object for at least a predetermined period of time.

8. The vehicle surroundings monitoring apparatus according to claim 6, wherein if the structure recognition unit determines that the third high luminance image portion is the image of one of the components of the traffic signal structure, the attention needed object detecting unit determines that an image of an object located above the third high luminance image portion in the captured image is not the image of the attention needed object.

9. The vehicle surroundings monitoring apparatus according to claim 1, further comprising the infrared camera capturing an infrared image.

10. The vehicle surroundings monitoring apparatus according to claim 9, wherein the infrared camera includes a semiconductor image sensor.

11. A vehicle surroundings monitoring apparatus for performing an object recognition on an object located in the vicinity of a vehicle on the basis of an image captured by an infrared camera mounted in the vehicle, comprising:
   a structure recognition means for detecting whether a featured image portion group is included in the captured image, the featured image portion group including:
      i) first and second high luminance image portions lined up side by side vertically or horizontally and a third high luminance image portion located below the first and second high luminance image portions, and
      ii) a feature indicating that a similarity of one of a luminance distribution and a shape between the first high luminance image portion and the second high luminance image portion is higher than between the third high luminance image portion and at least one of the first and second high luminance image portions,
   wherein upon detecting the featured image portion group in the captured image, the structure recognition means determines that at least the third high luminance image portion is an image of a component of a traffic signal structure.

12. A vehicle surroundings monitoring method for performing an object recognition on an object located in the vicinity of a vehicle, the method comprising:
  capturing an image by an infrared camera mounted in the vehicle;
  detecting, using a processor, whether a featured image portion group is included in the captured image, the featured image portion group including:
    i) first and second high luminance image portions lined up side by side vertically or horizontally and a third high luminance image portion located below the first and second high luminance image portions, and
    ii) a feature indicating that a similarity of one of a luminance distribution and a shape between the first high luminance image portion and the second high luminance image portion is higher than between the third high luminance image portion and at least one of the first and second high luminance image portions; and
  upon detecting the featured image portion group in the captured image, determining, using a processor, that at least the third high luminance image portion is an image of a component of a traffic signal structure.

* * * * *